United States Patent
Cho (10) Patent No.: US 8,264,562 B2
(45) Date of Patent: Sep. 11, 2012

(54) IMAGE DISTORTION CORRECTING METHOD AND DEVICE

(75) Inventor: Chul-Lae Cho, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 673 days.

(21) Appl. No.: 12/363,108

(22) Filed: Jan. 30, 2009

(65) Prior Publication Data
US 2009/0195676 A1    Aug. 6, 2009

(30) Foreign Application Priority Data
Jan. 31, 2008    (KR) .................. 10-2008-0010017

(51) Int. Cl.
*H04N 5/235*    (2006.01)
*H04N 9/73*    (2006.01)
(52) U.S. Cl. .................. 348/221.1; 348/223.1
(58) Field of Classification Search .... 359/221.1–224.1, 359/273, 280; 382/167; 348/221.1–224.1, 348/273, 280
See application file for complete search history.

(56) References Cited

U.S. PATENT DOCUMENTS
2009/0066806 A1*    3/2009    Hayaishi ............. 348/223.1
2010/0020192 A1*    1/2010    Kim et al. ............ 348/223.1
* cited by examiner

*Primary Examiner* — Alicia M Harrington
(74) *Attorney, Agent, or Firm* — Birch, Stewart, Kolasch & Birch, LLP (57) ABSTRACT

Device and method of correcting a distortion occurring at the time of displaying a high-resolution image on a low-resolution display unit are provided. The image distortion correcting method includes the steps of: analyzing color levels of all pixels of an input original image; determining a variation of the color levels depending on positions of the pixels; adjusting the variation of the color levels in a region where the variation departs from a predetermined threshold value; correcting the color levels of the pixels in accordance with the adjusted variation; and outputting the corrected image. Accordingly, it is possible to correct the image distortion occurring at the time of displaying an image input from an image sensor on a display module.

8 Claims, 10 Drawing Sheets

IMAGE DISTORTION CORRECTING METHOD AND DEVICE

CROSS-REFERENCE TO RELATED APPLICATIONS

This application claims the benefit of Korean Patent Application No. 10-2008-0010017 filed with the Korean Intellectual Property Office on Jan. 31, 2008, the disclosures of which are incorporated herein by reference in their entirety.

BACKGROUND

1. Field of the Invention

The present invention relates to an image distortion correcting device, and more particularly, to device and method of correcting distortion occurring at the time of displaying a high-resolution image on a low-resolution display unit.

2. Related Art

Mobile communication devices including a camera module or digital cameras display an image taken via a lens on a display module and store the image in a storage medium such as a memory. A basic configuration of a camera display unit included in the mobile communication devices or the digital cameras is shown in FIG. 1.

Figure 1:
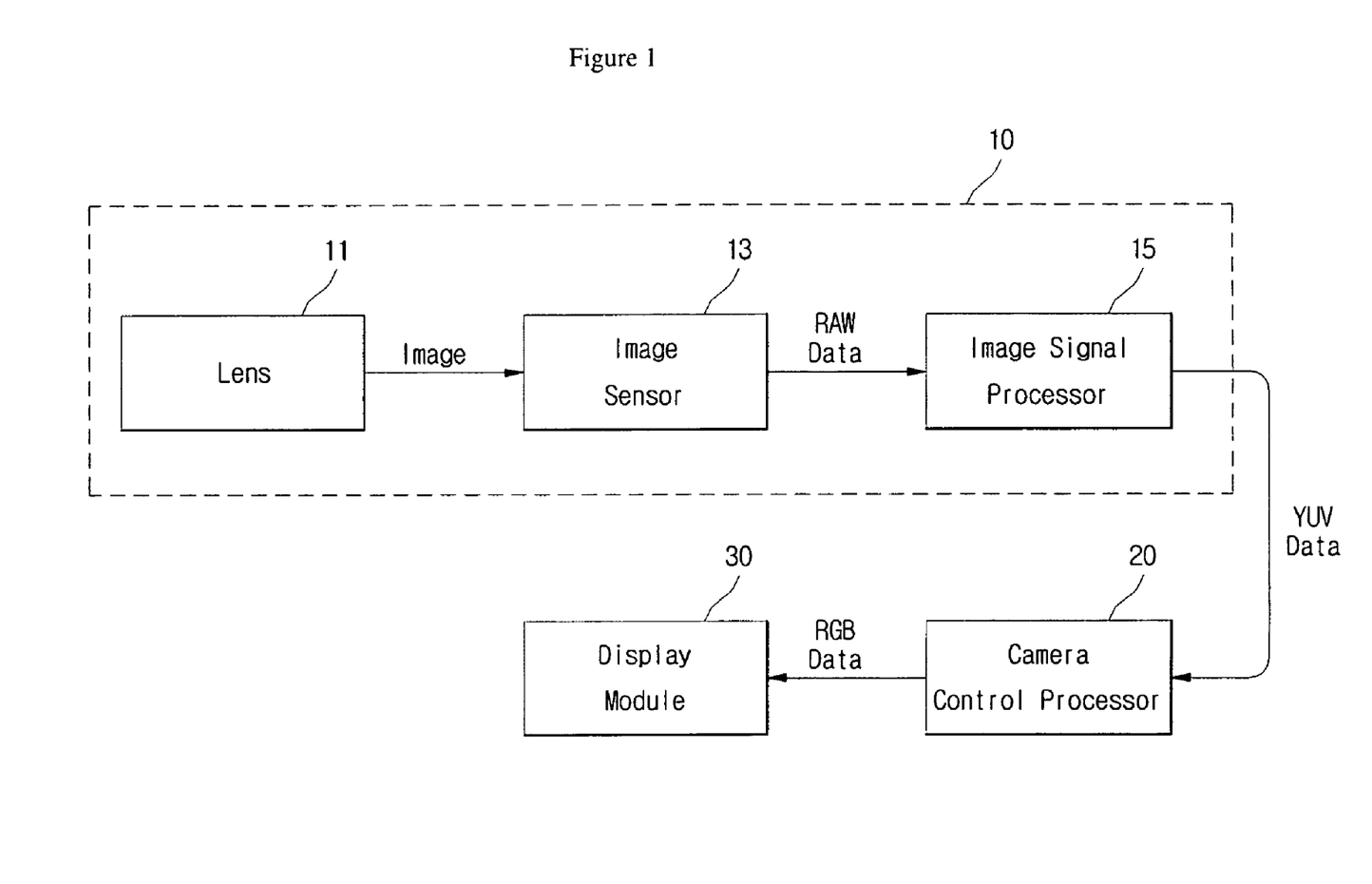
FIG. 1 is a diagram illustrating a basic configuration of a camera display unit.
Figure 2:
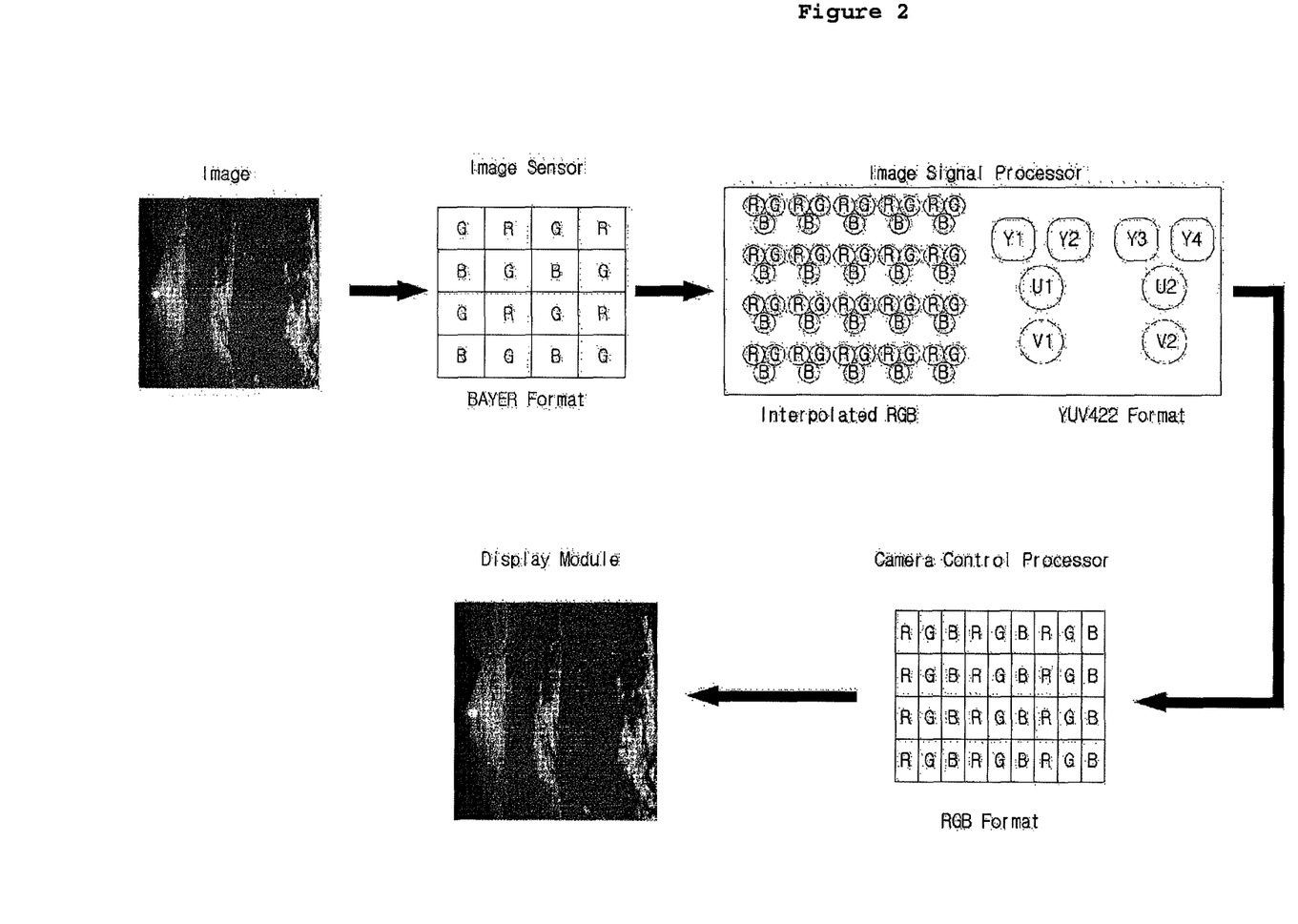
FIG. 2 is a diagram illustrating image conversion formats until a taken image is displayed on a display module.

FIG. 1 is a diagram illustrating a basic configuration of a camera display unit and FIG. 2 is a diagram illustrating image conversion formats until a taken image is displayed on a display module.

Referring to FIG. 1, the camera display unit includes a camera module 10, a camera control processor 20, and a display module 30. The camera module 10 includes a lens 11, an image sensor 13, and an image signal processor 15.

Light from a subject is imaged through the lens 11 and is transmitted to the image sensor 13.

The image sensor 13 reproduces an image using a characteristic that semiconductor is sensitive to light. The image sensor 13 includes an array of small photosensitive diodes called pixels. The pixels sense the light intensity and wavelengths resulting from the subject, read the light intensity and wavelengths as electric values, and amplify the electric values into levels that can be processed. That is, the image sensor 13 is a semiconductor device converting an optical image into electrical signals.

In the image sensor 13, plural pixels are arranged in a two-dimensional structure and the respective pixels convert the intensity of incident light into electrical signals. By measuring the electrical signals, the intensity of light incident on the pixels can be acquired and an image in the unit of pixels can be constructed using the electrical signals.

Since the respective pixels of the image sensor 15 generally extract pixel data of a single color of plural colors included in the image, information on the lost pixels should be estimated from information on the pixels around the lost pixels using a color filter array (CFA). The color filter array has a structure in which color filter elements allowing each pixel of the pixel array to transmit only light exhibiting a single color are regularly arranged. The color filter array may have various patterns depending on the structure in which the color filter elements are arranged. An RGB Bayer pattern is most widely used. Here, R means red, G means green, and B means blue.

A half the total number of pixels is assigned to green (G) and quarters of the total number are assigned to red (R) and blue (B), respectively. Each color image pixel has a repeated pattern of a red, green, or blue filter to acquire color information. For example, the Bayer pattern has a 2×2 arrangement.

The electrical signals based on the Bayer pattern in the image sensor 13, that is, raw data having a Bayer format, are transmitted to the image signal processor 15. Here, it is assumed that the raw data has an A×B resolution which is the resolution of the taken image.

The image signal processor 15 converts the raw data having the Bayer format into interpolated RGB data obtained by interpolating the raw data so as for the pixels to have red, green, and blue pixel data, respectively. The image signal processor 15 converts the interpolated RGB data into YUV data and transmits the YUV data to the camera control processor 20. Here, it is assumed that the YUV data has a C×D resolution smaller than that of the raw data as the taken image.

The YUV data has a format based on a characteristic that an eye is sensitive to luminance. Y represents the luminance and U and V represent the chrominance. The YUV data may have formats such as YUV422, YUV420, and YUV411, which are based on the number of bits assigned to the constituent values. For example, YUV422 means Y:U:V=4:2:2.

The camera control processor 20 reduces the resolution of the YUV data transmitted from the image signal processor 15 into an E×F resolution so as to correspond to the size of the display module 30. The camera module processor 20 converts the YUV data into RGB data and transmits the RGB data to the display module 30 so as to display the image data on the display module 30.

The taken image having the A×B resolution is reduced for display on the display module 30 by a reduction conversion. In the course, great distortion may occur at the time of reducing and displaying the taken image on the display module 30.

In the past, a technical solution for correcting physical properties of the image sensor and image distortion occurring at the time of converting data was studied.

Specifically, the physical distortion (due to lenses, mechanisms, and the like) occurring at the time of manufacturing the camera module 10 using the image sensor 13 and the image distortion occurring at the time of converting data (converting the raw data into the YUV data) mainly attracted attention. The luminance signal Y is used in correcting the image distortion in the YUV data output from the image signal processor 15. This correction may be effective in approaching the taken image, but there is a problem that a distorted image is actually displayed on the display module 30.

Specifically, in most cases, the resolution of the display module at the time of taking an image with an SXGA (1.3 M, 1280×1024) image sensor is a VGA (640×480) class or less. Accordingly, at the time of previewing the taken image, the camera module outputs the image with a 640×480 or 800×600 resolution, not the SXGA resolution. At this time, the image distortion occurs.

Figure 3:
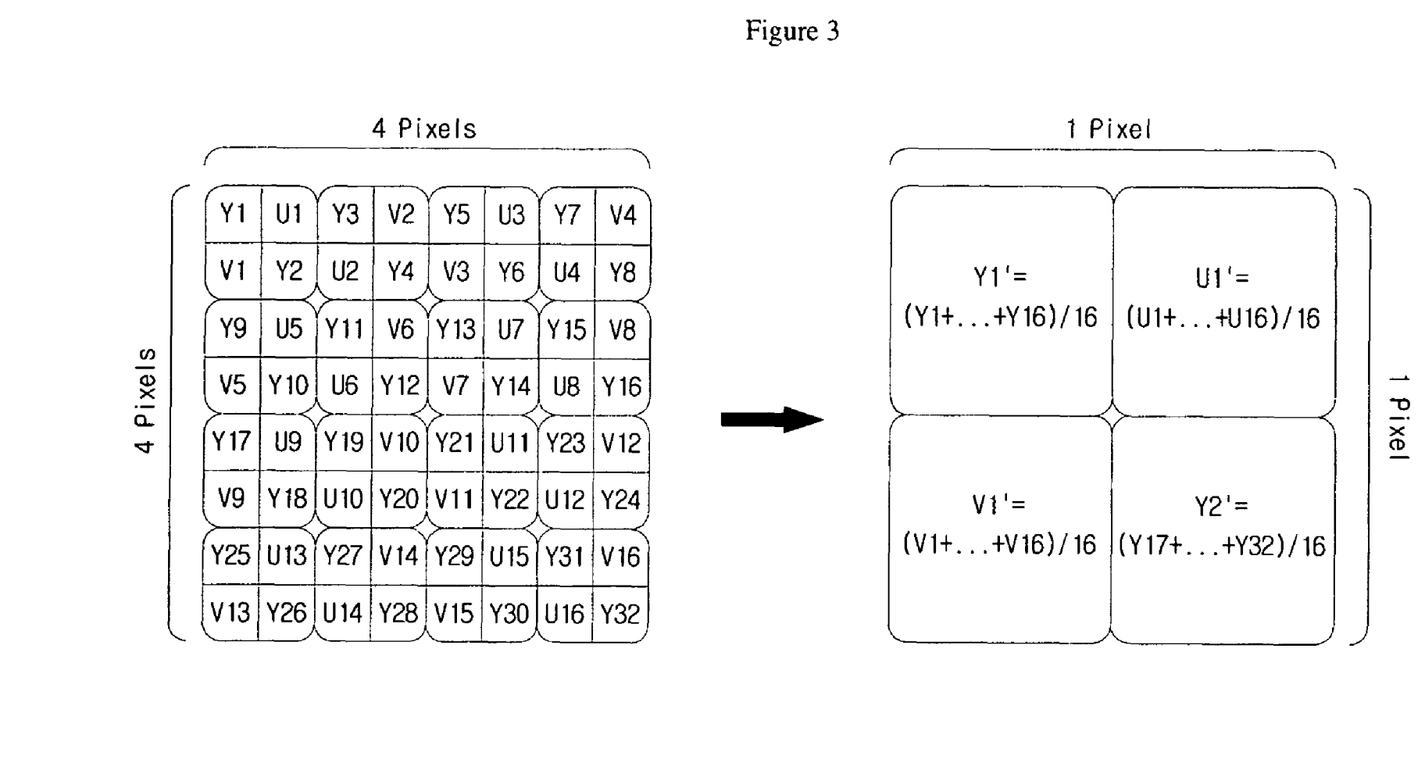
FIG. 3 is a diagram illustrating an example of an image reducing conversion.
Figure 4:
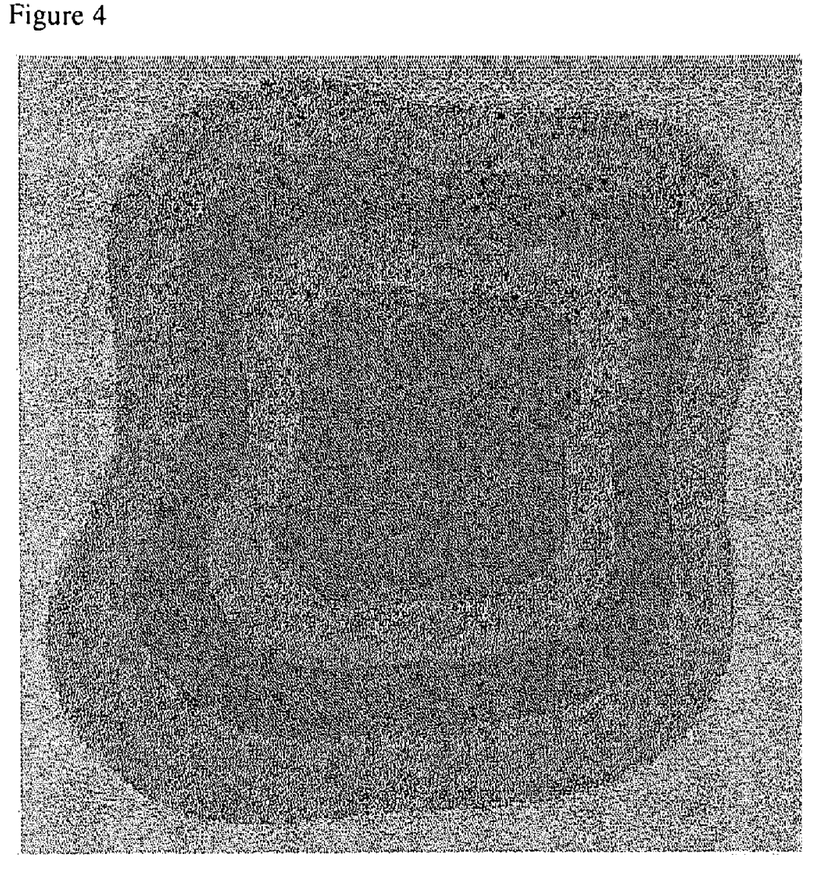
FIG. 4 is a diagram illustrating a distortion phenomenon occurring in the reduced image.

FIG. 3 is a diagram illustrating an example of an image reducing conversion and FIG. 4 is a diagram illustrating a distortion phenomenon occurring in the reduced image.

When the input image is reduced to ¼ in the course of image reducing conversion, 4×4 pixel data can be converted into 1×1 pixel data. Referring to FIG. 3, it is assumed that the 4×4 pixel data and the 1×1 pixel data have the YUV422 format.

In this case, Y1', U1', V1', and Y2' of the 1×1 pixel data are as follows.

$Y1'=(Y1+ \ldots +Y16)/16$
$U1'=(U1+ \ldots +U16)/16$
$V1'=(V1+ \ldots +V16)/16$
$Y2'=(Y17+ \ldots +Y32)/16$ The pixel data of the image converted by the image reducing conversion is different from the raw data of the taken image. Accordingly, there is a problem that the distortion like a contour line shown in FIG. 4 finally occurs.

SUMMARY

An advantage of some aspects of the invention is that it provides image distortion correcting method and device that can correct an image distortion occurring at the time of displaying an image input from an image sensor on a display module.

Another advantage of some aspects of the invention is that it provides image distortion correcting method and device that can reduce an image distortion at the time of converting a high-resolution image into a low-resolution image and displaying the converted image on a display module.

Another advantage of some aspects of the invention is that it provides image distortion correcting method and device that can reduce a user's fatigue by improving the quality of an image displayed on a display module.

According to some aspects of the invention, there are provided an image distortion correcting method of correcting an image distortion occurring in reducing a high-resolution image into a low-resolution image and a recording medium having recorded thereon a program for executing the method.

According to an aspect of the invention, there is provided an image distortion correcting method including the steps of: analyzing color levels of all pixels of an input original image; determining a variation of the color levels depending on positions of the pixels; adjusting the variation of the color levels in a region where the variation departs from a predetermined threshold value; correcting the color levels of the pixels in accordance with the adjusted variation; and outputting the corrected image.

The input original image may be an image having an RGB format in which each pixel has all pixel data of red, green, and blue.

The step of analyzing the color levels may include analyzing the color levels of red, green, and blue, respectively.

The step of determining the variation of the color levels may include determining the variation in one or more of an X axis direction and a Y axis direction.

The step of adjusting the variation of the color levels may include adjusting the variation of the color levels only when the variations of the color levels of red, green, and blue are equal or similar to each other.

The step of adjusting the variation of the color levels may include adjusting the variation of the color levels so that the variation of the color levels should not depart from the threshold value in the region.

The step of adjusting the variation of the color levels includes adjusting the variation of the color levels so that the color levels in the region vary linearly.

According to some aspects of the invention, there is provided an image distortion correcting device for correcting an image distortion occurring in reducing a high-resolution image into a low-resolution image.

According to another aspect of the invention, there is provided an image distortion correcting device including: a color analyzing section analyzing color levels of all pixels of an input original image; a variation determining section determining a variation of the color levels depending on positions of the pixels; a variation adjusting section adjusting the variation of the color levels in a region where the variation departs from a predetermined threshold value; and a correcting section correcting the color levels of the pixels in accordance with the adjusted variation.

The original image may be an image having an RGB format in which each pixel has all pixel data of red, green, and blue.

The color analyzing section may analyze the color levels of red, green, and blue.

The variation determining section may determine the variation in one or more of an X axis direction and a Y axis direction.

The variation adjusting section may adjust the variation of the color levels only when the variations of the color levels of red, green, and blue are equal or similar to each other.

The variation adjusting section may adjust the variation of the color levels so that the variation of the color levels should not depart from the threshold value in the region.

The variation adjusting section may adjust the variation of the color levels so that the color levels in the region vary linearly.

Other aspects, features, and advantages will be apparent from the accompanying drawings, the appended claims, and the following detailed description.

According to the above-mentioned image distortion correcting method and device, it is possible to correct an image distortion occurring at the time of displaying an image input from the image sensor on the display module.

It is possible to reduce an image distortion at the time of converting a high-resolution image into a low-resolution image and displaying the converted image on a display module.

It is possible to reduce a user's fatigue by improving the quality of an image displayed on the display module.

DESCRIPTION OF EXEMPLARY EMBODIMENTS

The invention can be variously modified in various embodiments and specific embodiments will be described and shown in the drawings. The invention is not limited to the embodiments, but it should be understood that the invention includes all the modifications, equivalents, and replacements belonging to the spirit and the technical scope of the invention. When it is determined that detailed description of known techniques associated with the invention makes the gist of the invention obscure, the detailed description will be omitted.

Terms, "first", "second", and the like, can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include", "have", and the like are intended to indicate that features, numbers, steps, operations, elements, components, or combinations thereof used in the following description exist and that the possibility of existence or addition of one or more different features, numbers, steps, operations, elements, components, or combinations thereof is not excluded.

Hereinafter, exemplary embodiments of the invention will be described in detail with reference to the accompanying drawings.

Figure 5:
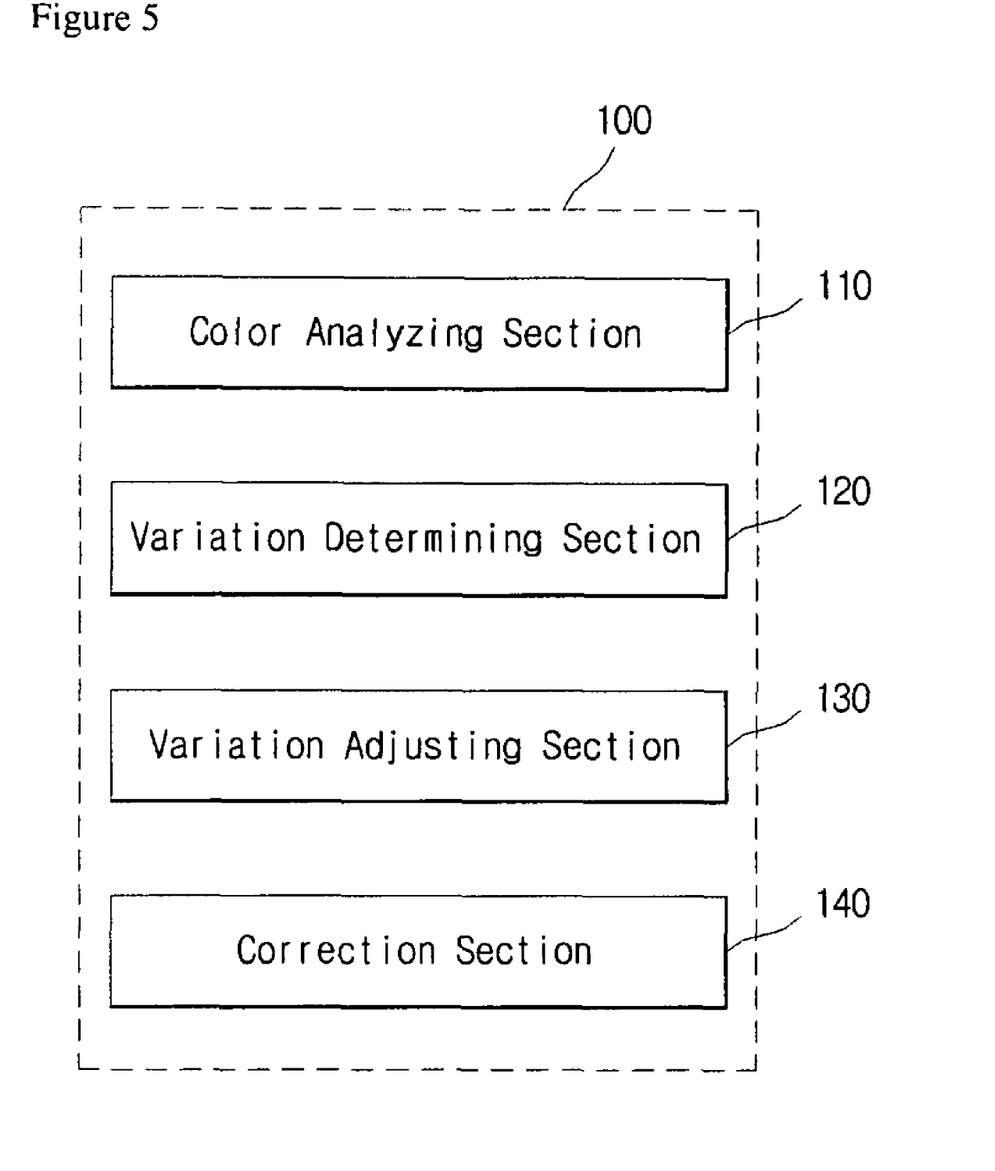
FIG. 5 is a block diagram illustrating an image distortion correcting device according to an embodiment of the invention.

FIG. 5 is a block diagram illustrating an image distortion correcting device according to an embodiment of the invention.

The image distortion correcting device 100 includes a color analyzing section 110, a variation determining section 120, a variation adjusting section 130, and a correcting section 140.

The color analyzing section 110 analyzes color levels of all pixels in an original image input to the image distortion correcting device 100. The color levels of the pixels to be analyzed are RGB levels and may be red levels, green levels, and blue levels.

The variation determining section 120 determines a variation of the color levels analyzed by the color analyzing section 110. The variation is determined in one or more of an X axis direction and a Y axis direction. The variation of the color levels may be determined for the colors of red, green, and blue individually or together.

The variation adjusting section 130 selects a region where the variation of the color levels determined by the variation determining section 120 departs from a predetermined threshold value and adjusts the variation of the color levels in the region. When the variation of the color levels is greater than that of the color levels of the neighboring region, an image distortion like a contour line shown in FIG. 4 possibly exists in the region of the original image. Accordingly, by adjusting the variation of the color levels so as to be slow, it is possible to correct the image distortion like a contour line. To adjust the variation of the color levels so as to be slow, a linear conversion method can be used, which will be described in detail later with reference to the accompanying drawings.

The adjustment of the variation in color level in the variation adjusting section 130 requires that the variations of red, green, and blue should be equal or similar to each other. When the variation of one color is different from the variations of the other colors, it does not mean the image distortion, but the variation of the representative color of the pixels in the original image. When the variations of red, green, and blue are equal or similar to each other, the image distortion like a contour line appears.

The correcting section 140 corrects the color levels of the pixels in the region in accordance with the variation adjusted by the variation adjusting section 130. The correcting section 140 may correct the color levels of the pixels included in a region adjacent to the corresponding region.

The corrected image in which the color levels of the pixels are corrected is finally output from the image distortion correcting device 100.

The original image input to the image distortion correcting device 100 is an image having been subjected to the reduction conversion and has data in the RGB format in which each pixel has all pixel data of red, green, and blue. The original image input to the image distortion correcting device 100 and the corrected image output from the image distortion correcting device 100 preferably have the same resolution.

When the image distortion correcting device 100 according to an embodiment of the invention is applied to the camera display device shown in FIG. 1, the image distortion correcting device 100 may be connected between the camera control processor 20 and the display module 30 or may be embodied as one element of the camera control processor 20.

A method of correcting the image distortion (for example, the distortion like a contour line) due to the image reducing conversion in the original image by the use of the image distortion correcting device 100 will be described in detail with reference to FIG. 6 and the subsequent drawings.

Figure 6:
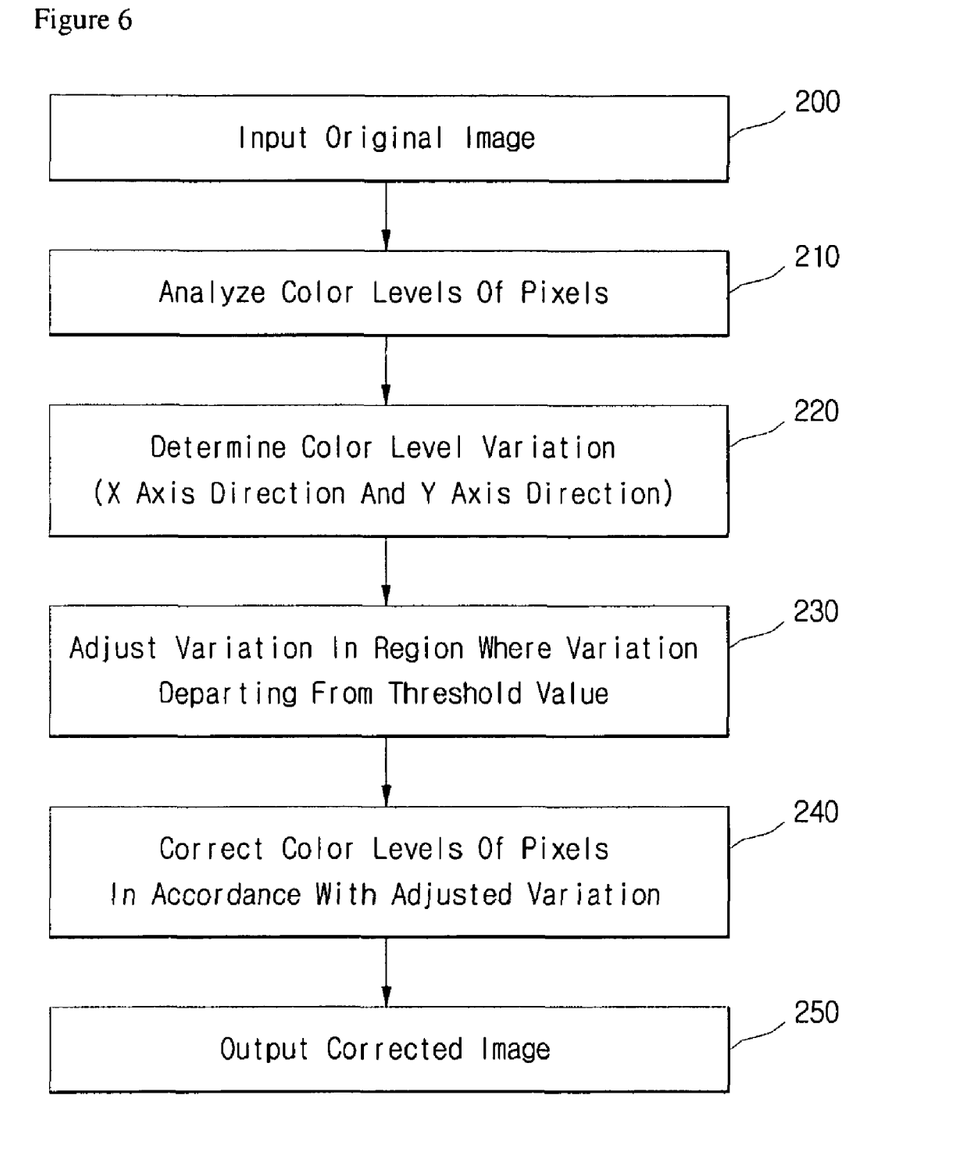
FIG. 6 is a flow diagram illustrating an image distortion correcting method according to the embodiment of the invention.
Figure 7:
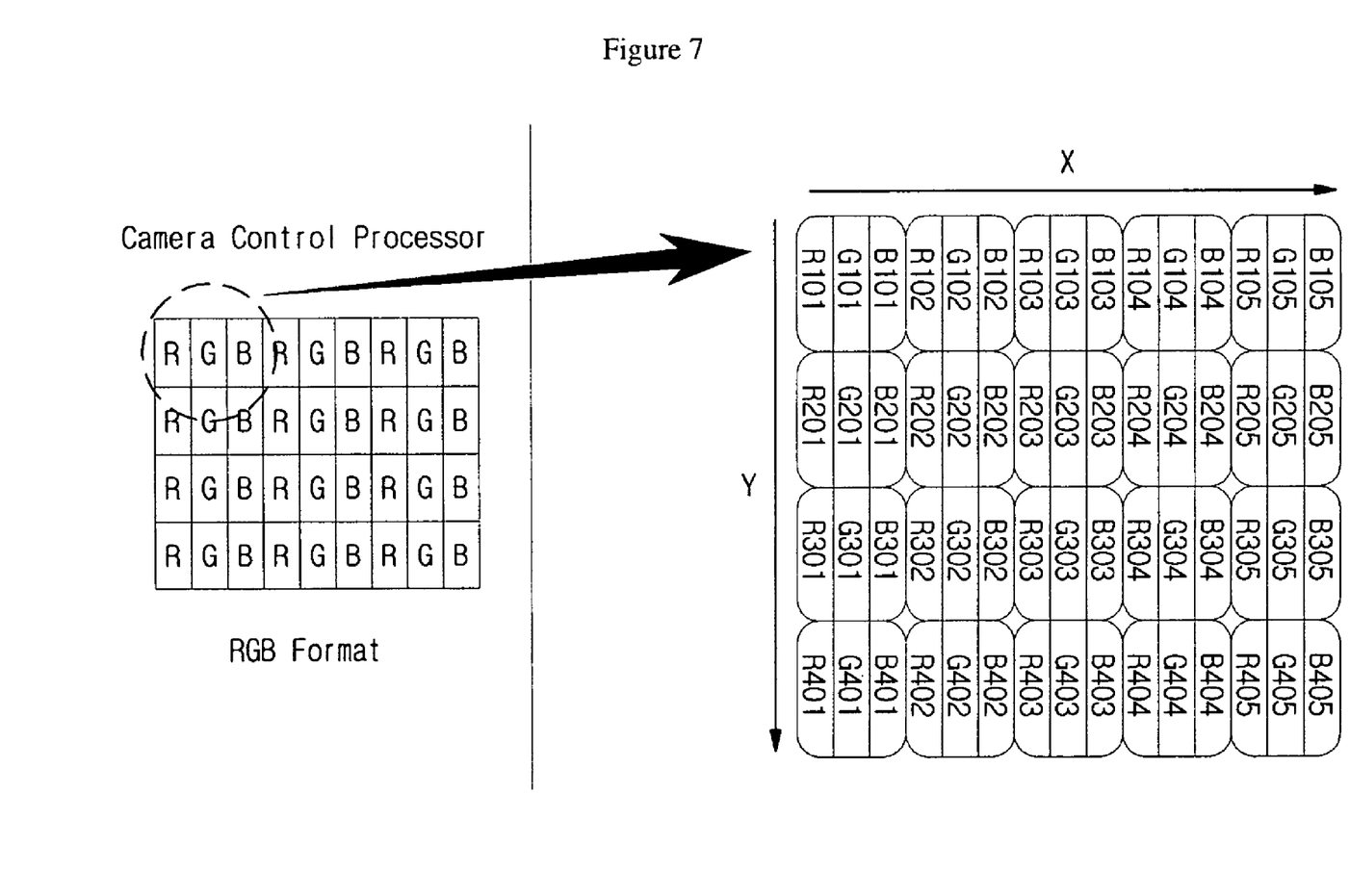
FIG. 7 is an enlarged view illustrating an original image having an RGB data format.
Figure 8:
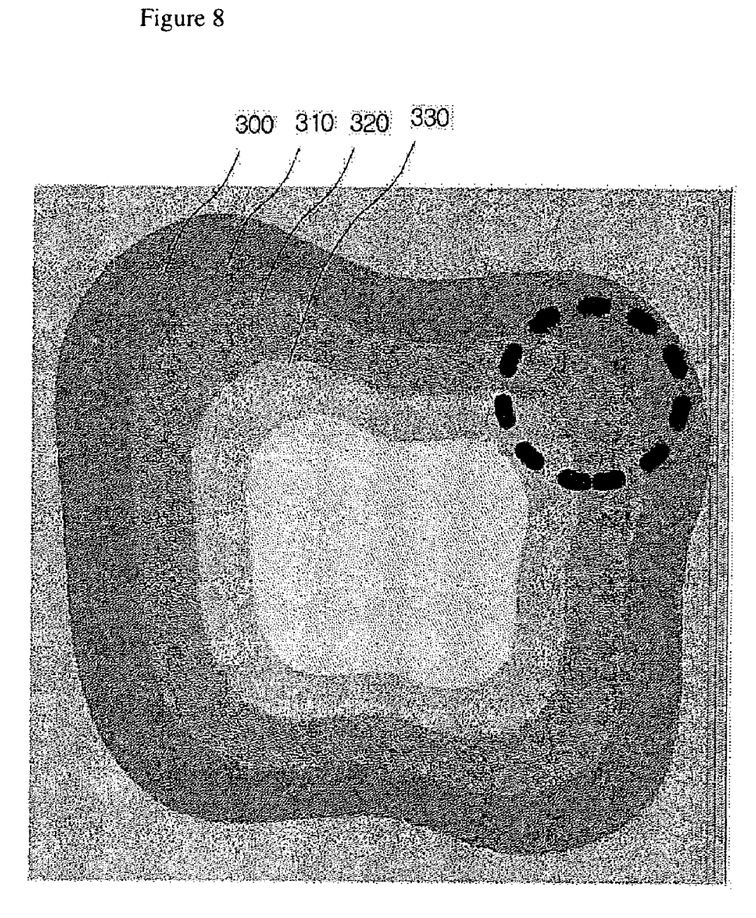
FIG. 8 is a diagram illustrating an original image having an image distortion like a contour line.
Figure 9:
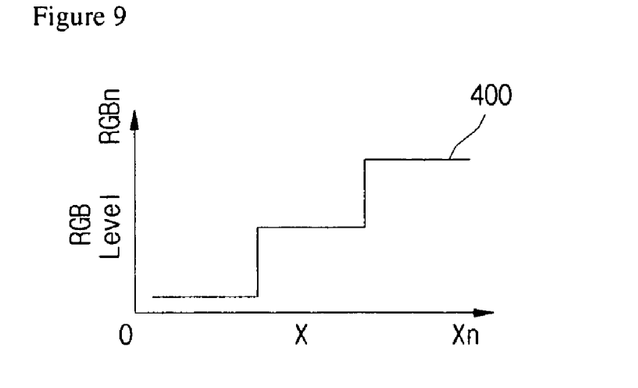
FIG. 9 is a graph illustrating a color level variation before correction.
Figure 10:
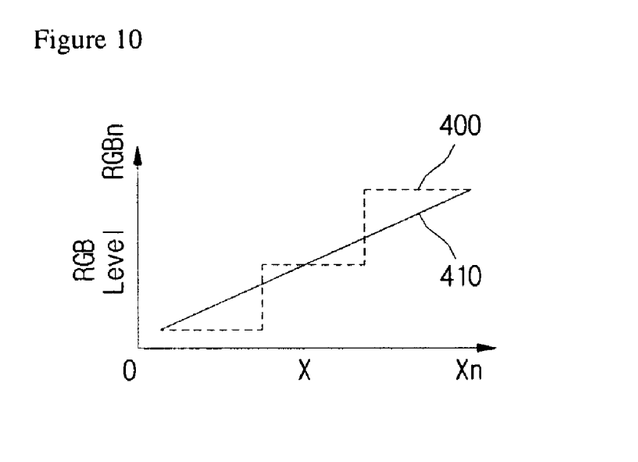
FIG. 10 is a graph illustrating a color level variation adjusted ideally.
Figure 11:
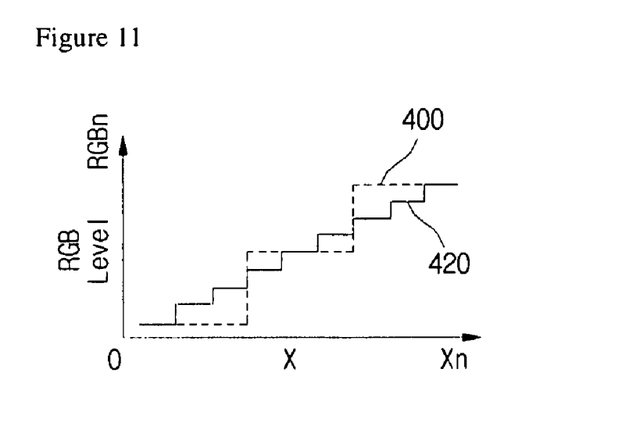
FIG. 11 is a graph illustrating a color level variation adjusted according to an embodiment of the invention.
Figure 12:
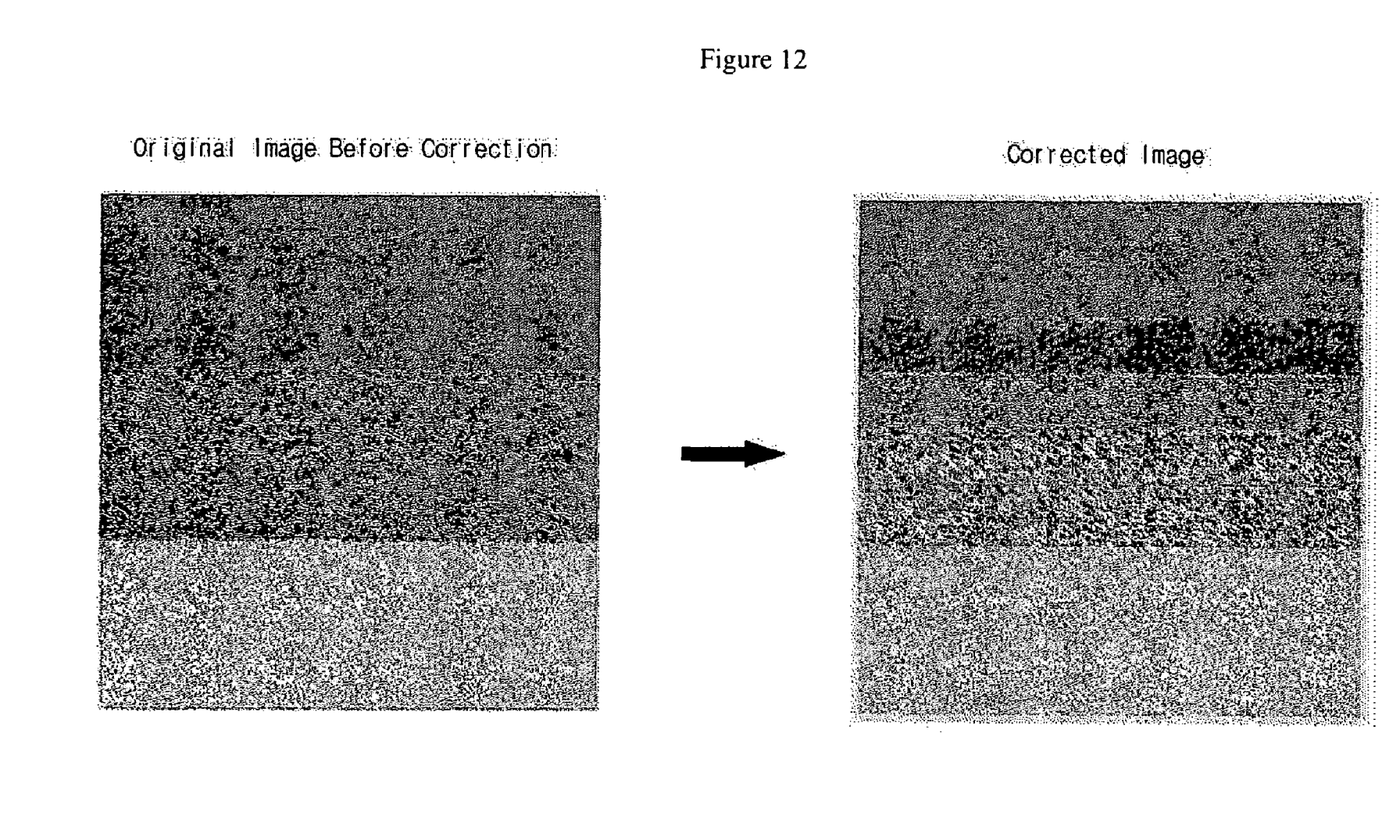
FIG. 12 is a diagram illustrating an original image before correction and a corrected image.

FIG. 6 is a flow diagram illustrating an image distortion correcting method according to the embodiment of the invention. FIG. 7 is an enlarged view illustrating an original image having an RGB data format. FIG. 8 is a diagram illustrating an original image having an image distortion like a contour line. FIG. 9 is a graph illustrating a color level variation before correction. FIG. 10 is a graph illustrating a color level variation adjusted ideally. FIG. 11 is a graph illustrating a color level variation adjusted according to an embodiment of the invention. FIG. 12 is a diagram illustrating an original image before correction and a corrected image.

In step 200, an original image is input to the image distortion correcting device 100.

Here, the original image may be an image obtained by reducing a high-resolution image taken currently or taken in advance and stored in a storage medium into a low-resolution image for display on the display module.

The original image may have pixel data of red, green, and blue in the unit of pixels for display on the display module. Referring to FIG. 7, the original image is data having an RGB format and each pixel has the pixel data of red, green, and blue. For example, the first pixel at the left-upper end has the pixel data of red, green, and blue such as R101, G101, and B101. The second pixel in the X axis direction has the pixel data of red, green, and blue such as R102, G102, and B102 and the second pixel in the Y axis direction has the pixel data of red, green, and blue such as R201, G201, and B201.

In step 210, the color analyzing section 110 analyzes the color levels of the pixels in the input original image. That is, the color analyzing section 110 can analyze the red level, the green level, and the blue level on the basis of the pixel data of the pixels.

In step 220, the variation determining section 120 determines the variation of the color levels in a predetermined direction using the analyzed color levels. When the horizontal direction of the original image is the X axis direction and the vertical direction thereof is the Y axis direction, the variation determining section 120 determines one or more of the variation in the X axis direction and the variation in the Y axis direction. The variation determining section 130 determines the variations of the color levels of red, green, and blue by colors.

In step 230, the variation adjusting section 130 selects a region where the variation of the color levels departs from a predetermined threshold value and adjusts the variation in the region. For this purpose, the variations of the color levels by colors should be equal or similar to each other. When one color level varies rapidly but the other color levels do not vary, it means that an image distortion does not occur but the color varies in the image.

In step 240, the correcting section 140 corrects the color levels of the pixels in the region in accordance with the adjusted variation. In another embodiment, the correcting section 140 may correct the color levels of the pixels in the neighboring region.

In step 250, when the adjustment of variation (step 230) and the correction of color levels (step 240) are completed in all the regions in the original image, the finally corrected image is output.

It is assumed that the image distortion like a contour line shown in FIG. 8 occurs in the original image. Then, the method of adjusting the variation of the color levels in the X axis direction will be described for the purpose of convenient understanding and explanation of the invention. The method of adjusting the variation of the color levels in the Y axis direction is the same as in the X axis direction.

It is assumed that a region 300 represents a contour line shape, a first sub region 310 has the pixel data of (150, 150, 150) (which means the pixel data of (R, G, B)), a second sub region 320 has the color level of (190, 190, 190), and a third sub region 330 has the color level of (230, 230, 230). Here, the variation 400 of the color levels in the region 300 is shown in FIG. 9. When the predetermined threshold value is 10, the variation in color level between the sub regions is 40, which means that it departs from the predetermined threshold value. That is, the region has the image distortion and need be corrected.

The variation in color level 400 has a step-like shape and the boundary between the sub regions has a rapid variation. In this case, since the contour line shape appears as shown in FIG. 8, it is necessary to adjust the variation.

Ideally, it is preferable that the step-like variation 400 should be adjusted to a linear variation 410 as shown in FIG. 10 so as to remove the contour line shape. However, since the image has discontinuous values representing colors by the pixels, a representative value based on the number of pixels that can be displayed in the region is used. The representative value may be one of a middle value, an average value, the maximum value, and the minimum value.

It is assumed that nine pixels are arranged in the X axis direction in the region 300, three pixels are arranged in the first sub region 310, three pixels are arranged in the second sub region 320, and three pixels are arranged in the third sub region 330. In this case, the color levels in the region 300 preferably vary linearly from 150 to 230 as shown in FIG. 10. However, since the nine pixels each have only one color level, the color levels of the pixels have 9-divided discontinuous values of 150, 160, 170, 180, 190, 200, 210, 220, and 230.

Here, the first pixel may have one of 150 to 160 and a representative value is selected and determined as the color level of the pixel. One of the middle value of 155, the average value of 155, the maximum value of 160, and the minimum value of 150 may be the color level of the pixel.

By the use of the correction of the color levels, as shown in FIG. 12, the region having a distribution of three color levels can be corrected to a region having a distribution of nine color levels, thereby outputting a corrected image having the reduced image distortion.

The above-mentioned image distortion correcting method can be embodied by a computer program. Codes and segments of the program can be easily made by computer programmers skilled in the art. The program can be stored in a computer-readable storage medium and can be read and executed by a computer to embody the method. The storage medium can include a magnetic recording medium, an optical recording medium, and a carrier wave medium.

Although the invention has been described with reference to the exemplary embodiments, it will be understood by those skilled in the art that the invention can be modified and changed in various forms without departing from the spirit and scope of the invention described in the appended claims.

What is claimed is:

1. An image distortion correcting method comprising:
analyzing color levels of all pixels of an input original image;
determining a variation of the color levels depending on positions of the pixels;
adjusting the variation of the color levels in a region where the variation departs from a predetermined threshold value;
correcting the color levels of the pixels in accordance with the adjusted variation; and
outputting the corrected image,
wherein the adjusting of the variation of the color levels includes adjusting the variation of the color levels only when the variations of the color levels of red, green, and blue are equal or similar to each other.

2. The image distortion correcting method according to claim 1, wherein the input original image is an image having an RGB format in which each pixel has all pixel data of red, green, and blue.

3. The image distortion correcting method according to claim 1, wherein the analyzing of the color levels includes analyzing the color levels of red, green, and blue, respectively.

4. The image distortion correcting method according to claim 1, wherein the determining of the variation of the color levels includes determining the variation in one or more of an X axis direction and a Y axis direction.

5. The image distortion correcting method according to claim 1, wherein the adjusting of the variation of the color levels includes adjusting the variation of the color levels so that the variation of the color levels should not depart from the threshold value in the region.

6. The image distortion correcting method according to claim 5, wherein the adjusting of the variation of the color levels includes adjusting the variation of the color levels so that the color levels in the region vary linearly.

7. A recording medium having recorded thereon a computer-readable program allowing a computer to execute an image distortion correcting method comprising:
analyzing color levels of all pixels of an input original image;
determining a variation of the color levels depending on positions of the pixels;
adjusting the variation of the color levels in a region where the variation departs from a predetermined threshold value;
correcting the color levels of the pixels in accordance with the adjusted variation; and
outputting the corrected image,
wherein the adjusting of the variation of the color levels includes adjusting the variation of the color levels only when the variations of the color levels of red, green, and blue are equal or similar to each other.

8. An image distortion correcting device comprising:
a color analyzing section analyzing color levels of all pixels of an input original image;
a variation determining section determining a variation of the color levels depending on positions of the pixels;
a variation adjusting section adjusting the variation of the color levels in a region where the variation departs from a predetermined threshold value, wherein the variation adjusting section adjusts the variation of the color levels only when the variations of the color levels of red, green, and blue are equal or similar to each other; and
a correcting section correcting the color levels of the pixels in accordance with the adjusted variation.

* * * * *